United States Patent [19]

Righele et al.

[11] 4,313,240

[45] Feb. 2, 1982

[54] ROTARY FEED PUMP FOR A CONTINUOUS MACHINE FOR FILLING SKINS WITH MINCEMEAT

[75] Inventors: Giovanni B. Righele, Zane'; Giuseppe Scorzato, Marano, both of Italy

[73] Assignee: Risco Brevetti S.p.A., Zane', Italy

[21] Appl. No.: 145,261

[22] Filed: Apr. 30, 1980

[30] Foreign Application Priority Data

Apr. 30, 1979 [IT] Italy ............................... 21460 B/79

[51] Int. Cl.³ .............................................. A22C 11/08
[52] U.S. Cl. ...................................................... 17/37
[58] Field of Search ............... 17/33, 37, 35; 418/172; 141/313

[56] References Cited

U.S. PATENT DOCUMENTS 3,922,755  12/1975  Righele ................................. 17/33

FOREIGN PATENT DOCUMENTS 2127764  10/1972  France ................................. 17/37

*Primary Examiner*—Willie G. Abercrombie
*Attorney, Agent, or Firm*—Cushman, Darby & Cushman

[57] ABSTRACT

The pump comprises an outer stator and an inner rotor provided with axially movable radial blades controlled by upper and lower annular cams. The upper cam and a dividing baffle disposed immediately downstream of a tangential delivery mouth are rigid with an upper closure plate to constitute a single-piece cover mounted on a raised central part of the rotor. An annular collar integral with said cover is disposed between said central part of the rotor and the rotor blades.

4 Claims, 6 Drawing Figures

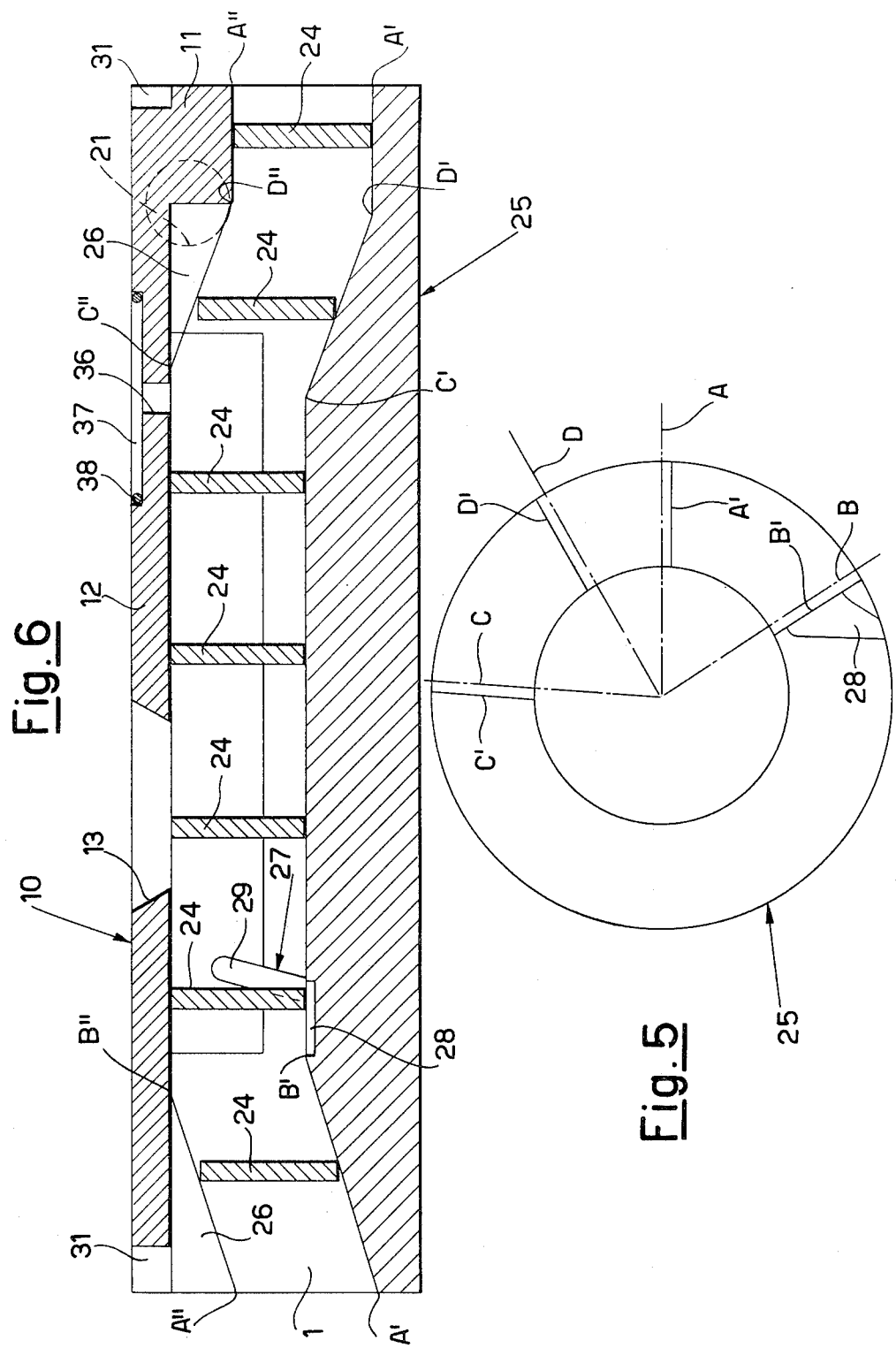

ROTARY FEED PUMP FOR A CONTINUOUS MACHINE FOR FILLING SKINS WITH MINCEMEAT

This invention relates to a rotary pump for a continuous machine for filling skins with mincemeat, of the type described in Italian Pat. No. 918,876 and in the U.S. Pat. No. 3,922,755 of Dec. 2, 1975.

The pump described in Italian Pat. No. 918,876 comprises essentially a stator provided with a cylindrical cavity, and a rotor rotatable about its axis, the rotor being inserted coaxially in the stator cavity and being formed from a central cylindrical raised part and a peripheral lowered part, such that between the cylindrical wall of the stator and said parts of the rotor there is defined an annular chamber in which the mincemeat is made to advance from a filling mouth to a delivery mouth suitably disposed and shaped such that the last portion of the path which the meat takes in advancing towards said delivery mouth is substantially straight. The meat is conveyed from the filling mouth to the delivery mouth by a number of mobile blades slidably housed in a like number of radial cavities in the peripheral part of the rotor, and caused to slide along the rotor axis in accordance with a predetermined programme which provides for their emergence from the overall limits of the peripheral part of the rotor in a zone downstream of the delivery mouth and upstream of the filling mouth in the direction of rotation of the rotor, and their complete return to within the overall limits of the peripheral part of the rotor in a zone upstream of the filling mouth and downstream of the delivery mouth. This predetermined programme is defined by a suitably shaped lower annular cam which is disposed in a fixed position below the peripheral part of the rotor, and on which the blades rest. A dividing baffle is also provided in the annular chamber immediately downstream of the delivery mouth and rigid with the stator.

In order to improve its operation and practicality, the relative U.S. Pat. No. 3,922,755 provides certain improvements to said pump, one of the main improvements being represented by the fact that the rise and fall motion of the rotor blades is adjusted both by the aforesaid lower cam and by a fixed upper cam shaped in a complementary manner. This upper cam is rigid with a cap mounted on the central part of the rotor and locked angularly relative to the stator. The dividing baffle for the annular chamber, which is disposed immediately downstream of the delivery mouth, is also rigid with this cap. Above the cap there is disposed a cover wall for the stator cavity, through which the mincemeat filling mouth is provided.

The resulting pump has various operational advantages which are well described in U.S. Pat. No. 3,922,755 described heretofore. However, it has certain problems with regard to the possibility of meat leakage from the pumping zone to the discharge parts of the pump (from where, macerated, it can be returned to the cycle, so ruining the product) as a consequence of the slack which obviously has to be provided between the various pieces in relative movement, in particular between the central part of the rotor and the overlying cap.

The object of the present invention is to provide a rotary pump comprising further improvements over those of Italian Pat. No. 918,876 and of the U.S. Pat. No. 3,922,755 in particular with regard to the leakage of meat from the pumping zone.

This object is attained according to the invention by a rotary pump of the aforesaid type, wherein the upper cam and the baffle which divides the annular pumping chamber are rigid with a flange which acts as a closure cover for said annular chamber, and which, replacing the cap of the U.S. Pat. No. 3,922,755, is mounted on the central part of the rotor by means of a rigid annular collar disposed between said central part and the pumping blades associated with the lowered peripheral part of the rotor.

According to the invention, the entire fixed upper part of the pump is therefore formed in a single piece of simple construction, which upperly closes the pumping chamber and, more importantly, by being inserted by means of its annular collar, between the pumping blades and the central part of the rotor, prevents the meat from finding leakage paths towards this latter and thus towards the discharge part of the pump.

The upper wall of said plate is preferably provided with a circular depression sealed laterally and communicating with the underlying pumping chamber for the product by way of a through bore in the plate. This provides a greater thrust surface, through which a downward thrust is generated which overcomes the upward thrust generated by the product in the pumping chamber and enables the plate to be kept permanently adhering in a yieldable manner with the upper edge of the blades. This latter edge is preferably slightly raised relative to the central part of the rotor and to the corresponding peripheral edge of the stator, in order to offer the plate a small degree of slack to enable the plate to move progressively downwards so that it automatically compensates for the inevitable wear of the blades to a certain extent.

The characteristics of the present invention will be more apparent from the detailed description given hereinafter of one embodiment thereof illustrated by way of example in the accompanying drawings, in which:

FIG. 5 is a plan view of the lower cam in the pump of FIGS. 1 to 4;

FIG. 6 shows the development in a vertical plane of the two cams which control the rise and fall movements of the rotor blades in the pump of FIGS. 1 to 4.

Figure 1:
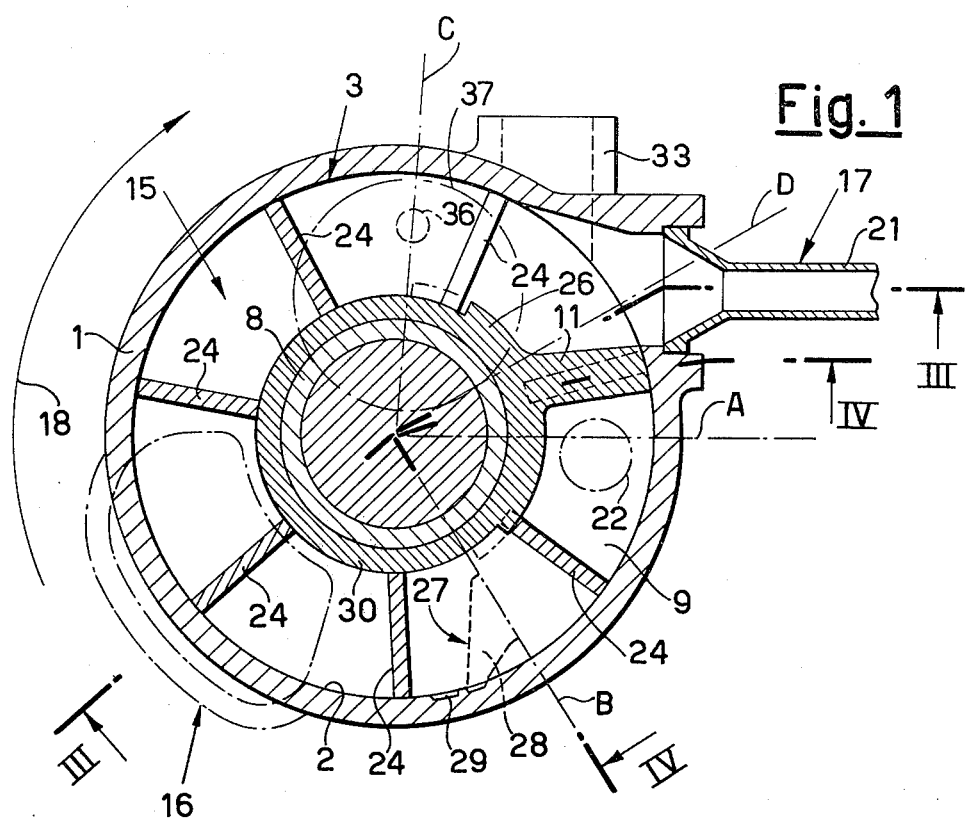
FIG. 1 is a horizontal section through a pump according to the invention, taken on the line I—I of FIG. 3.
Figure 2:
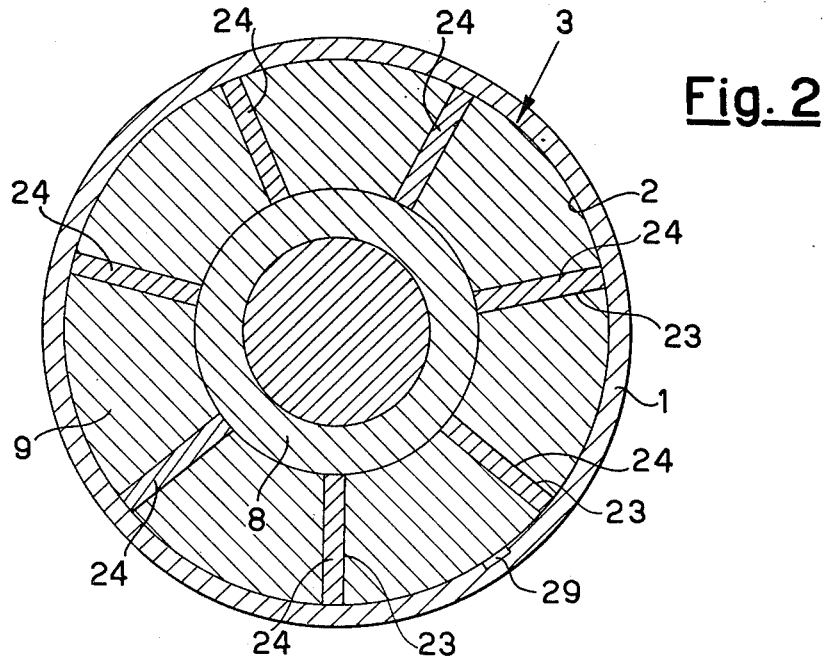
FIG. 2 is a further horizontal section through said pump taken on the line II—II of FIG. 3.

The pump shown in the drawings comprises a stator 1 provided with a cylindrical cavity 2, inside which there is coaxially disposed a rotor 3 rotatable about its axis under the control of a drive shaft 4 supported by the stator 1 by way of three bearings 5, 6 and 7. The rotor 3 is composed of a central cylindrical part 8 and a lowered annular peripheral part 9. A cover 10 is mounted on the central part 8, and is constructed in the form of a single body including a circular plate 12 provided with a bore 31 and a slot 13, and a further bore 36 surrounded by an upper circular depression 37 sealed by an annular gasket 38 (FIGS. 1 and 6), an annular collar 30 disposed about the central part 8 of the rotor 3 and inserted slackly in an annular groove 32 in the peripheral part 9 of the rotor 3 (FIGS. 3 and 4), a radial baffle 11 and a cam 26 which will be described in detail hereinafter.

Figure 4:
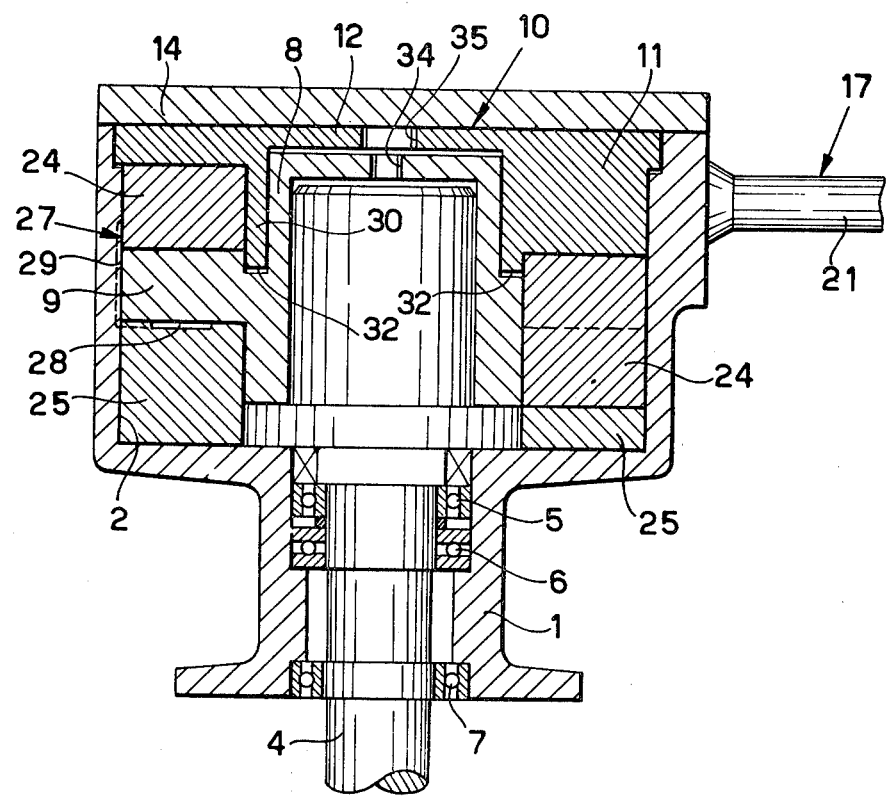
FIG. 4 is a further vertical section through said pump taken on the line IV—IV of FIG. 1.

As can be seen from FIG. 4, the lower end of the radial baffle 11 is in grazing contact with the upper end of the peripheral part of the rotor 3. Between the stator 1, rotor 3 and cover 10 there is thus defined an annular chamber 15 which is provided with a filling mouth 16, a delivery mouth 17 and a separation baffle 11 disposed immediately downstream of the filling mouth 17 in the direction of rotation of the rotor 3 (arrow 18 in FIG. 1). The filling mouth 16 is constituted by the outlet aperture, coaxial with the slot 16 in the plate 12, of a feed hopper 19 provided with a spiral stirrer 20 and a flange 14 superposed and fixed on the cover 10. The delivery mouth 17 is constituted by a lateral bore in the stator, at which there is disposed a nozzle with a funnel-shaped inlet 21, on which the skin to be filled with the mincemeat delivered by the pump is fitted. The annular chamber 15 is also provided with an air suction mouth 22 in a position corresponding with the bore 31 in the cover 10, for connection to a vacuum pump for the purpose described hereinafter.

The peripheral part 9 of the rotor is provided with seven equidistant radial apertures 23, in which a like number of blades 24 are slidably housed, and are caused to slide along the axis of the rotor in accordance with a predetermined programme which provides for them to progressively emerge from the overall limits of the spherical part 9 of the rotor as far as the plate 12 of the cover 10 (the left hand blade in FIGS. 3 and 4) in a zone A-B situated downstream of the dividing baffle 11 and upstream of the filling mouth 16 in the direction of rotation of the rotor (FIG. 1), and to progressively return within the overall limits of said peripheral part of the rotor (right hand blade in FIGS. 3 and 4) in a zone C-D situated downstream of the filling mouth 16 and upstream of the delivery mouth 17 in the direction of rotation of the rotor (FIG. 1).

This predetermined programme is defined by the engagement existing between the lower and upper ends of the blades 24 and two annular cams 25 and 26 shaped in a complementary manner, the former being lower and the latter upper. As can be seen from FIGS. 5 and 6, which illustrate it respectively in plan view and developed in a vertical plane, the lower cam 25 is composed of a rising portion A'-B', a raised flat portion B'-C', a descending portion C'-D', and a lowered flat portion D'-A'. As can be seen in FIG. 5, the positions of the shape variation points A', B', C' and D' coincide with the positions indicated by the reference letters A, B, C and D, with the exception of a small displacement equal to one half the thickness of the blades, the obvious purpose of this being to ensure that the points at which the height variations of the blades begin truly coincide with the points A, B, C and D indicated in FIG. 1. From FIG. 6, it can be seen that the upper cam 26, which as stated forms part of the cover 10, is exactly complementary to the lower cam 25, with the exception of a small lead in the beginning and end points A″ and B″ of the rise with respect to A' and B', and of a small lag in the beginning and end points C″ and D″ of the descent with respect to C' and D'. These lead and lag distances are equal to the thickness of the blades 24.

As can be seen from FIGS. 3 and 4, the lower cam 25 extends circularly below the peripheral part 9 of the rotor, and its width is exactly equal to the width of this latter so that between the stator 1, cam 25 and rotor 3 there is defined a lower annular chamber the height of which varies between a minimum value in the zone of maximum height of the cam 25 (where the peripheral part 9 of the rotor is in grazing contact with said cam), and a maximum value in the zone of minimum height of the cam 25. As the blades 24 are variously inserted in said annular chamber, a pumping action is performed in the chamber, and finds its outlet in a channel 27 composed of a horizontal portion 28 provided in the upper surface of that part of the cam 25 which is immediately downstream of point B', and a vertical portion 29 provided in the inner wall of the stator 1.

Figure 3:
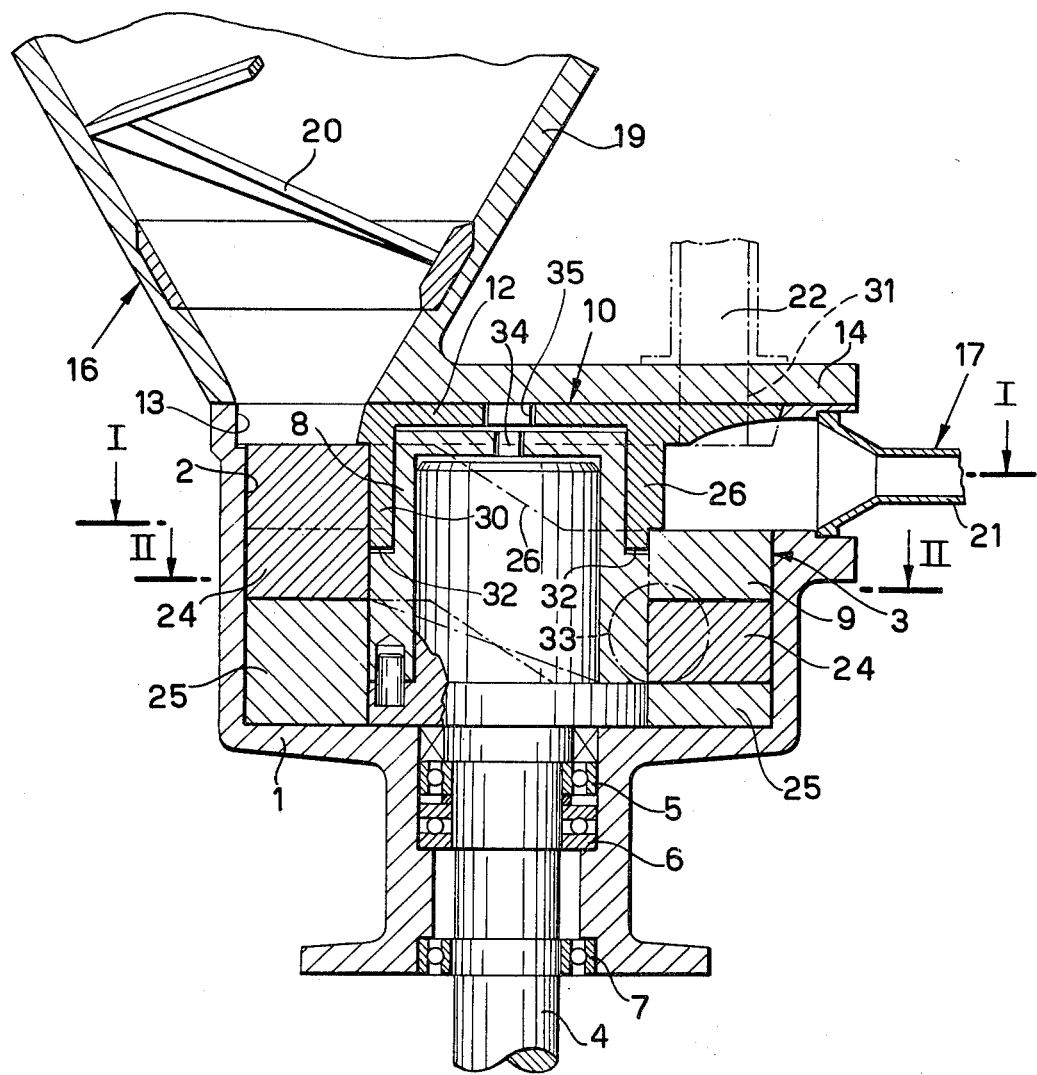
FIG. 3 is a vertical section through said pump taken on the line III—III of FIG. 1.

As stated, and as can be seen from FIGS. 3 and 4, the upper cam 26 is situated above the peripheral part 9 of the rotor, and is rigid with the cover 10.

Finally, an aperture 33 is provided communicating with the said lower annular chamber, its purpose being to allow access to said lower annular chamber for periodical cleaning.

The operation of the pump shown on the drawings is as follows. Because of the rise and fall motion transmitted to the blades 24 by the complementary cams 25 and 26, that part of the annular chamber 15 lying between points B and C is divided into a plurality of compartments, into each of which a metered quantity of mincemeat is fed from the filling mouth 16. By virtue of the rotary motion of the rotor 3, these metered quantities of meat are conveyed towards the delivery mouth, being subjected in the latter part of their path along the annular chamber 15 to an approximately straight-line movement free from obstacles, which means that the meat is free from mashed or finely minced portions which could prejudice its preservation and visual presentation.

As the various parts of the cover 10 are constructed in a single piece, and in particular because of the annular collar 30, there are no product leakages from said annular chamber 15 other than from below the dividing baffle 11 and through the gaps between the blades 24 and radial apertures 23 in the rotor 3. The meat which leaks in this manner is in any case collected in the lower annular chamber, from which it is conveyed by the pumping action exerted therein by the blades 24, into the channel 27 and thus again into the upper annular chamber 15.

The depression 37 with the bore 36 ensures a certain downward thrust to the plate 12 during operation, which opposes and overcomes the upward thrust exerted by the product during pumping delivery. The plate 12 is thus kept adhering in a yieldable manner to the upper edge of the blades 24, while a small gap is left between the plate and the rotor 3 and between the periphery of the plate and the lateral wall of the stator 1 and between the collar 30 and the groove 32 in the rotor 3, to allow the wear of the blades to be compensated to a certain extent.

It should be noted that this pump structure gives maximum facility of dismantling for periodical washing of the pump. In this respect, it is necessary only to remove the hopper 19, pull the cover 10 up by means of an appropriate tool to be screwed into a threaded bore 35, and extract the rotor 3 complete with blades by means of a similar tool to be screwed into a threaded bore 34 (FIGS. 3 and 4). The nozzle 33 allows discharge of the water used for washing the stator cavity with the pump dismantled.

We claim:

1. A rotary pump for a continuous machine for filling skins with mincemeat, comprising a stator provided with a cylindrical cavity in which a rotor rotatable about its own axis is coaxially disposed, said rotor being composed of a raised cylindrical central part and a lowered annular peripheral part such that between said stator and said rotor there is defined an upper annular chamber provided with a filling mouth, a delivery mouth with its axis substantially tangential to said annular chamber in the direction of rotation of the rotor, and a dividing baffle disposed immediately downstream of said delivery mouth in the direction of rotation of the rotor, blades being slidably housed in said peripheral part of the rotor and being caused to slide along the axis of the rotor in accordance with a predetermined programme which provides for them to emerge from the overall limits of said peripheral part of the rotor in a zone downstream of said dividing baffle and upstream of said filling mouth, and to completely return within the overall limits of said peripheral part of the rotor in a zone downstream of said filling mouth and upstream of said delivery mouth, said predetermined programme being defined by a lower annular cam disposed rigid with the stator below said peripheral part of the rotor, and with the upper shaped surface of which are engaged the lower ends of said blades, and an upper annular cam complementary to the lower one, and with which are engaged the upper ends of said blades, wherein said dividing baffle and said upper annular cam are rigid with a closure plate for the annular pumping chamber constituted by a single-piece cover mounted on said raised central part by means of a rigid annular collar disposed between said central part of the rotor and said rotor blades.

2. A pump as claimed in claim 1, wherein the lower edge of said annular collar is inserted into a corresponding annular groove in said peripheral part of the rotor.

3. A pump as claimed in claim 2, wherein said closure plate is yieldably urged against the upper edge of the blades, whereas a small axial gap is left between the plate and stator and between the plate and rotor, between the lower edge of said annular collar and said groove in the rotor.

4. A pump as claimed in claim 1, wherein said closure plate is traversed by a bore providing communication between that part of said annular chamber in proximity to said delivery mouth, and a laterally sealed circular depression in the upper wall of the plate.

* * * * *